April 24, 1928.
H. G. EGLEY
1,667,658
GLARE SHIELD
Filed April 6, 1925
2 Sheets-Sheet 1
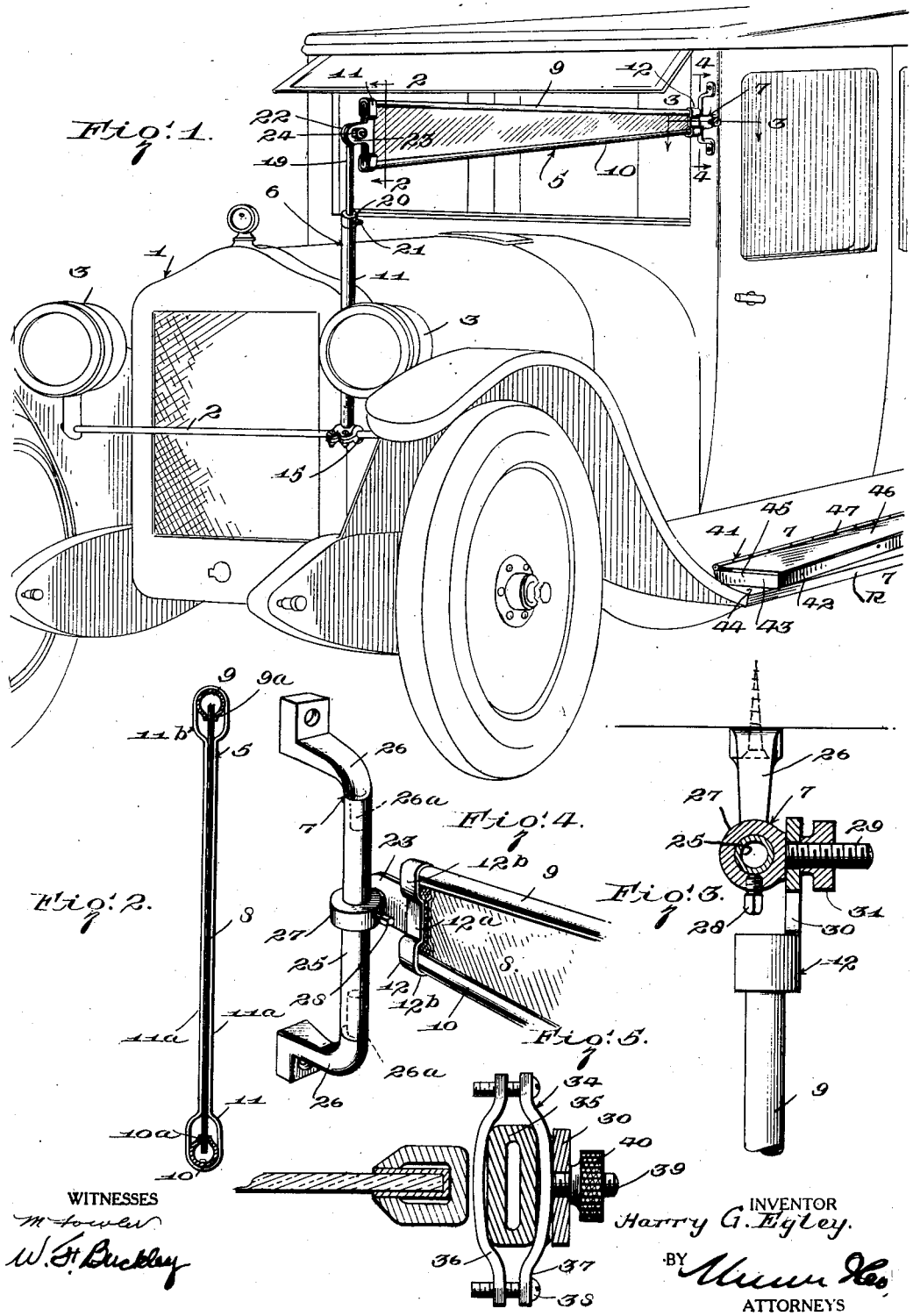
WITNESSES
INVENTOR
Harry G. Egley.
BY
ATTORNEYS April 24, 1928.
H. G. EGLEY
1,667,658
GLARE SHIELD
Filed April 6, 1925
2 Sheets-Sheet 2
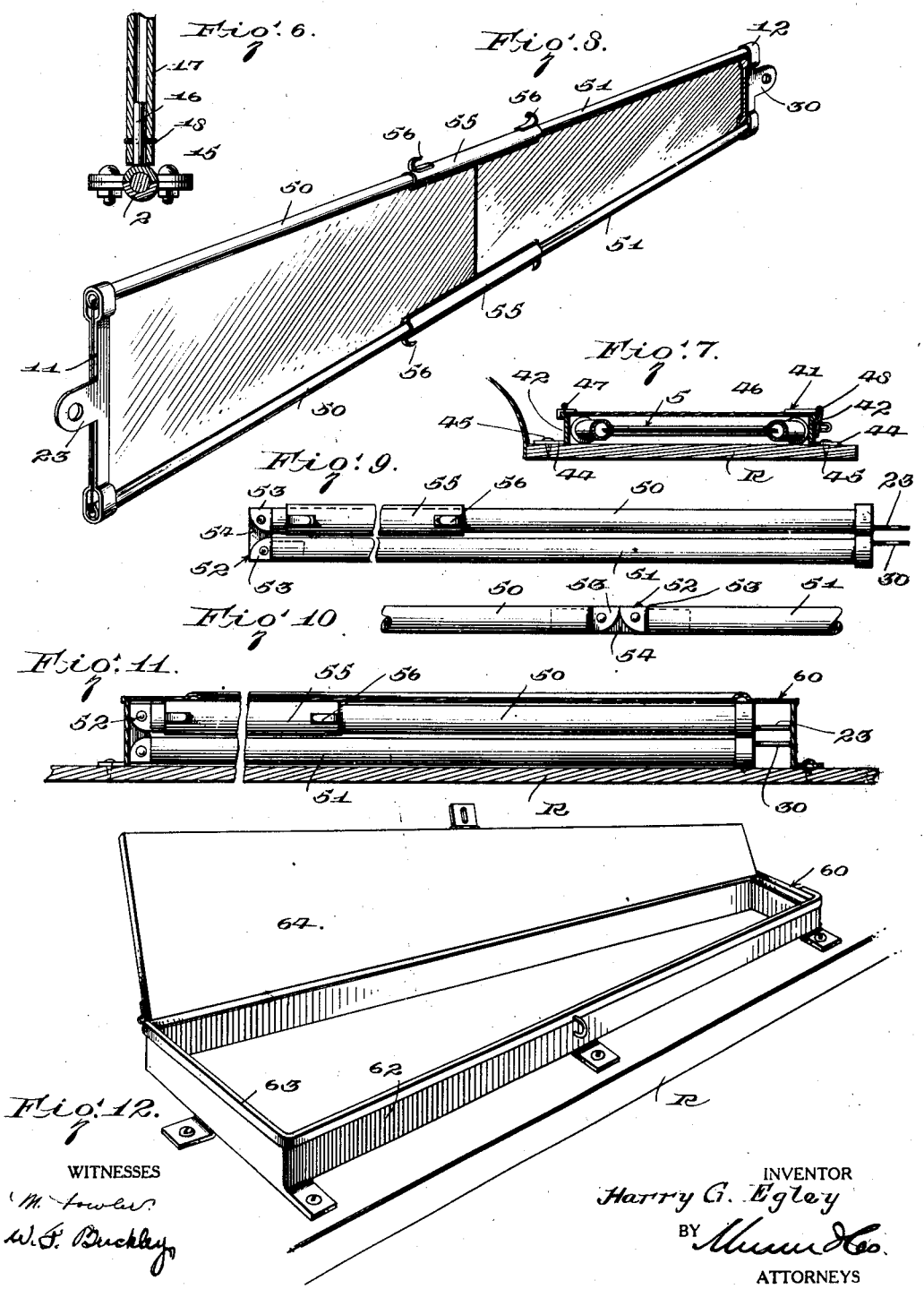
WITNESSES
INVENTOR
Harry G. Egley
BY
ATTORNEYS Patented Apr. 24, 1928.

1,667,658

UNITED STATES PATENT OFFICE.

HARRY GODFREY EGLEY, OF MORRIS PLAINS, NEW JERSEY.

GLARE SHIELD.

Application filed April 6, 1925. Serial No. 21,028.

This invention relates to a glare shield designed for use on automobiles or other vehicles.

The object of the invention resides in the provision of a device of this character which will protect the eyes of the driver of the vehicle on which the shield is mounted from the blinding glare of headlights of oncoming vehicles without obstructing the view of the driver to any appreciable extent. In fact the glare shield constituting the present invention eliminates the glare in such a novel manner as to afford to the driver of the vehicle equipped with the glare shield the additional illumination of the oncoming headlights without glare or blinding effect and in such a way as to enable the driver to take full advantage of the increased lighting effect. The driver's control over the machine is enhanced and as the blinding effects of the glare are eliminated in a satisfactory and effective manner, accidents involving serious injury or loss of life and property are avoided.

Another object is to provide a glare shield having these advantages and capacities and which is of simple and durable construction and comparatively inexpensive to manufacture; which can be readily applied to the automobile or other vehicle on which it is used or which when not needed may be readily taken down and quickly and easily stored in a compartment or receptacle provided for that purpose; and which can be easily adjusted to suit the stature or preferred driving position of different drivers so that the shield performs its functions without the necessity of the driver changing his natural driving position or shifting his head or eyes.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing an automobile equipped with a glare shield embodying the present invention;

Figure 2 is a view in section on line 2—2 of Figure 1;

Figure 3 is a sectional view on line 3—3 of Figure 1;

Figure 4 is a perspective view illustrating the support for the rear end of the shield;

Figure 5 is a sectional view illustrating a type of support for the rear end of the shield adapted for use on open cars;

Figure 6 is a view partly in section and partly in elevation showing the construction of the lower portion of the adjustable support for the front of the shield;

Figure 7 is a sectional view on line 7—7 of Figure 1;

Figure 8 is a perspective view of a modified form of shield showing the same in operative position;

Figure 9 is a view in elevation showing the shield of Figure 8 folded up;

Figure 10 is a fragmentary view in top plan showing the hinge construction employed in frame of the shield shown in Figure 8;

Figure 11 is a view partly in section and partly in elevation showing the shield of Figure 8 stored in its receptacle, and Figure 12 is a perspective view of the receptacle shown in Figure 11.

Referring to the drawings and more especially to Figures 1 to 7 inclusive the numeral 1 designates generally an automobile of the closed car type and having an ordinary cross rod 2 connecting its headlights 3 and also having the usual front corner posts 4.

The present invention proposes the use of a pennant shaped shield indicated generally at 5 mounted at its forward end on an adjustable support designated generally at 6 and at its rear end on an adjustable support designated generally at 7.

The shield 5 is pennant shaped in that its forward end is large and in that the upper and lower edges of the shield converge rearwardly to its other or small end. The body 8 of the shield consists of two thin sheets of white celluloid. Colored glass, pyrolin or other transparent material may be used in place of the celluloid but the white celluloid in double thickness has been found to give excellent results. The body 8 of the shield is mounted in a rigid frame consisting of upper and lower frame members 9 and 10, a front frame member 11, and a rear frame member 12. The frame members 9 and 10 consist of split or slotted tubing, the splits confronting in the assembly and the edges defining the splits or slots being rounded as indicated at 9ª and 10ª to prevent marring of or injury to the body 8 of the shield and to facilitate assembly and disassembly while insuring sufficient frictional contact to hold the body 8 firmly in the frame members, the tubing constituting the frame members 9 and 10 being resilient and tensioned to press against the body 8 to some extent. The front frame member 11 and rear frame member 12 are of similar construction though of different size and these frame members comprise spaced side plates 11ª and 12ª respectively and enlarged and curved end portions 11ᵇ and 12ᵇ connecting the side plates 11ª and 12ª respectively. The ends of the tubular frame members 9 and 10 are received in the curved end portions 11ᵇ and 12ᵇ. Only the portions of the ends of the tubular frame members 9 and 10 opposite the splits or slots are engaged with and secured to (by riveting or brazing) the curved end portions 11ᵇ and 12ᵇ, the major portion of the ends of the tubular frame members 9 and 10 being left free so that their resiliency and capacity for flexion is unimpaired. The space between the side plates 11ª of the front frame member 11 permits of the insertion and removal of the sheets making up the body 8 into and from the frame.

The front support 6 comprises a clamp 15 made of a pair of suitably shaped sections fastened together in clamping relation on the cross rod 2. The clamp is preferably secured to the cross rod immediately adjacent the left headlight 3 but it may be fastened in any position on the rod 2. The upper section of the clamp has integrally formed therewith or suitably secured thereto a stud 16 which extends vertically upward. A tubular rod 17 (constituting one element of an extensible standard) has its lower end fitted on the stud 16 and pinned thereto as at 18. A rod 19 completes the extensible standard and is telescopically fitted in the tubular rod 17 and is held in any vertical adjustment by means of a collar 20 secured in adjusted position on the rod 19 by a set screw 21 and engageable with the upper end of the tubular rod 17. The upper end 22 of the rod 19 is flattened out and apertured and in the assembly the end 22 lies flush against an apertured plate 23 integral with or suitably secured to the front frame member 11. The end 22 and plate 23 are held together by a screw, bolt and nut or any suitable fastening means designated at 24.

The rear support 7 comprises a bracket having a tubular body portion 25 and angular attaching lugs 26 fastened to the left front corner post of the car and supports the body 25 of the bracket in spaced relation to the post. The tubular body of the bracket is engaged with studs 26ª of the lugs 26, the studs fitting in the ends of the tubular body. A collar 27 is slidably fitted on the tubular body portion and is held in adjusted position by a set screw 28. A stud 29 is integrally formed with or suitably connected to the collar 27 and projects laterally therefrom. In the assembly the stud 29 is engaged in an opening provided in a plate 30 formed on the rear frame member 12. A knurled thumb nut 31 threaded on the stud 29 serves to releasably hold the parts in position.

When the shield is used on open cars a different type of rear support designated generally at 34 is used to adapt the rear support for mounting on the windshield frame 35 (see Figure 5) which is found in open cars in the place of the corner posts of closed cars. The support 34 comprises clamp members 36 and 37 clamped in frame 35 by clamp screws 38. The clamp 37 has a stud 39 engageable with the opening of plate 30 and held against displacement by a knurled thumb nut 40.

The shield when not in use is disassociated from the front and rear supports which are left on the car and may be conveniently stored in a receptacle 41 provided on the running board R or on any other suitable part of the car. The receptacle 41 comprises side walls 42 and end walls 43, secured by lugs 44 and fastening devices 45 to the running board or other part of the car on which the receptacle is mounted. The running board or the other part of the car on which the receptacle is mounted provides the bottom of the receptacle. A top, 46 preferably of metal is hinged as at 47 to one of the side walls and is received in the closed position in a seat formed in the other side wall and in the end walls. A hasp and staple 48 or other suitable means may be employed to hold the cover closed or to lock the same.

In order that the shield may be more compactly stored it may be preferred to construct the shield as shown in Figures 8 to 11 inclusive. The shield of Figures 8 to 11 is identical with that shown in Figures 1 to 7 and the description hereinabove applies thereto except that each of the upper and lower tubular frame members are made of two sections, designated at 50 and 51, which are hingedly connected together by means of a hinge 52. The hinge 52 permits the sections of the shield to fold up against each other as shown in Figures 9 and 10 or to be extended for use as shown in Figure 8, the hinge limiting the relative swinging movement of the section to a position wherein they are in alignment with each other as shown in Figure 8. Preferably each of the hinges connecting the sections of the frame members comprises a pair of ears 53 having curved confronting edges and a plate 54 pivotally connecting the ears. To hold the sections extended split tubes 55 are provided and are fitted on the sections 50 and 51 of the frame members as shown in the drawing. The tube 55 frictionally grips the sections 50 and 51 but may be shifted along the sections to cause the tube to lie whole on one section to permit folding as shown in Figures 9 and 10 or to overlap both sections of each frame member as shown in Figure 8. Finger pieces 56 may be provided to facilitate shifting of the tubes 54. The body of the shield is also made in section with the meeting edges of the sections overlapping or beveled so that the shield body while continuous in assembly is readily foldable with the frame for storage purposes.

A receptacle 60 is provided for the folded shield and is shown in Figures 11 and 12. The receptacle 60 is similar to the receptacle 41 and differs only in that it is smaller. The receptacle 60 requires only half the space of the receptacle 41 and has as in the other case side walls 61, and walls 62, a cover 64 and all of the other auxiliary features described in connection with the receptacle 41.

After the shield has been properly adjusted to the driver, all that will be necessary for him to do to attach it will be to slip the tubing, attached to the forward end of the shield, into the permanently attached tubing, push it down to the adjustable stop, which has been previously set at the point which brings the shield to the proper position for the driver, slip the rear end over the stud on the rear support and tighten the knurled nut on the rear and front end of the shield. This operation is simple, easy, cannot be confusing and requires but a few moments time while the advantages obtained by using the shield are many. The driver has a perfectly clear view in front of his car and his half of the road at all times, has ample light as he has the full use of his own lights and in addition the help from the lights of the car coming toward him, minus the glare, which is a remarkable help, especially in cases where one is driving a car on which the lights are rather poor when this help is especially noticed. This enables the driver to at all times clearly see either a pedestrian in his path or near it or any marked or unmarked obstruction on his side of the road, gives him a clear view of the extreme right side of the roadway so as to avoid ditches and soft ground and to plainly see curves in the road, thus avoiding a great many accidents resulting in death, personal injuries and damage to property and will also allow the driver to proceed at his usual speed of travel without the annoying delay of slowing up or indeed coming to a complete halt when approaching another car with glaring lights, thus saving a great amount of time and also relieving to quite some extent the prevailing congestion in the highways in night driving. He is also protected from the glare of lights on cars which approach him from an intersecting highway from the left and which is the result of so many accidents. The glare of lights on cars coming from the right of an intersecting road do not interfere with the driver until they have made the complete turn into the driver's highway directly in front of him.

In order to obtain the proper adjustment of the shield, it is only necessary for the driver to note where the light of the approaching car comes on his windshield and either raise or lower the forward end of the shield so that the light will strike the forward end of the shield as nearly the center as possible, then note where the light leaves the windshield and either raise or lower the rear end so that the light will strike the center of the shield at the rear end. In order to obtain the correct distance at which he desires the shield to be effective, he has only to shift the front support on the cross bar between the headlights, horizontally, to the point required. This adjustment should be made on an ordinary width road and when he then travels on a wider road it will be even more effective while if the adjustment were made from the side of a very wide road it might not prove as effective for distance as desired on a narrow road. This adjustment would remain permanent and need never be changed as any driver could readily adapt himself temporarily to the position of the shield as adjusted by the original driver. However, should a change in the adjustment be desired, it can at any time be easily and quickly made.

I claim:

1. In a glare shield for vehicles, a tapering shield body, means for securing the smaller end of the body to the vehicle body, and means for securing the larger end of the shield body to the vehicle in front of the body thereof.

2. In a glare shield for vehicles, a shield body, vertically adjustable means for securing one end of the shield body to the body of the vehicle, a vertically adjustable means for securing the other end of the shield body to the vehicle in front of the body thereof.

3. In a glare shield for vehicles, a tapering shield carrying frame having apertured lugs on its end members, vertically adjustable means for securing the lugs on the smaller end of the shield frame to the vehicle body, and vertically adjustable means for securing the lugs on the larger end of the shield frame to the vehicle in front of the vehicle body.

4. In a glare shield for vehicles, a frame having end members provided with mounting plates, a shield body mounted in the frame, the frame extending substantially fore and aft of the vehicle in front and on the road side of the driver, means for supporting forward end of the frame at various vertical heights and including an extensible standard having its upper rod connected to the mounting plate of the front frame member, and means for supporting the rear end of the shield in any vertical adjustment and including a vertically adjustable member having a laterally projecting stud engaged with the mounting plate of the rear frame member.

5. In a glare shield for vehicles a foldable shield frame made up of hinged sections foldable flatly against each other or extendible in alignment with each other, split tubes slidable on the sections for holding the sections extended, and a sheet-like shield body carried by the frame and made up of sections corresponding to the sections of the frame, the frame and body when folded being adapted to be stored in a small compact receptacle.

6. In a glare shield for vehicles, a shield having one end secured to the body and the other to the frame in front of the body, whereby it will be permanently supported in an inclined position with respect to the front of the said body.

7. In a glare shield for vehicles, a pennant shaped shield, and means for securing the ends of the shield to the vehicle, the smaller end to the body and the larger end to the frame in front of the body, whereby it will be permanently supported on the vehicle with its larger end foremost and in an inclined position with respect to the front of said body.

HARRY GODFREY EGLEY.